US012026365B2

(12) United States Patent
Gilra

(10) Patent No.: US 12,026,365 B2
(45) Date of Patent: Jul. 2, 2024

(54) CONSTRAINED STROKE EDITING FOR DIGITAL CONTENT

(71) Applicant: Adobe Inc., San Jose, CA (US)

(72) Inventor: Anant Gilra, San Jose, CA (US)

(73) Assignee: Adobe Inc., San Jose, CA (US)

(*) Notice: Subject to any disclaimer, the term of this patent is extended or adjusted under 35 U.S.C. 154(b) by 9 days.

(21) Appl. No.: 17/964,406

(22) Filed: Oct. 12, 2022

(65) Prior Publication Data

US 2024/0126427 A1    Apr. 18, 2024

(51) Int. Cl.
*G06F 3/04883* (2022.01)
*G06F 3/0354* (2013.01)

(52) U.S. Cl.
CPC ...... *G06F 3/04883* (2013.01); *G06F 3/03545* (2013.01)

(58) Field of Classification Search
CPC ............ G06F 3/0488; G06F 3/04883; G06F 3/03545; G06F 3/04845; G06F 3/04842; G06T 11/60; G06T 11/80
See application file for complete search history.

(56) References Cited

U.S. PATENT DOCUMENTS

| | | | |
|---|---|---|---|
| 2013/0234964 A1* | 9/2013 | Kim | G06F 3/0488 345/173 |
| 2014/0267078 A1* | 9/2014 | Kukulski | G06F 3/04162 345/173 |
| 2018/0164988 A1* | 6/2018 | Sinn | G06F 3/04845 |
| 2020/0320763 A1* | 10/2020 | Rodgers | G06T 11/60 |

* cited by examiner

*Primary Examiner* — Temesghen Ghebretinsae
*Assistant Examiner* — Ivelisse Martinez Quiles
(74) *Attorney, Agent, or Firm* — FIG. 1 Patents

(57) ABSTRACT

Constrained stroke editing techniques for digital content are described. In these examples, a stroke constraint system is employed as part of a digital content creation system to manage input, editing, and erasure (i.e., removal) of strokes via a user interface as part of editing digital content. To do so, locations and attributes of a displayed stroke are used to constrain location and/or attributes of an input stroke.

20 Claims, 13 Drawing Sheets

CONSTRAINED STROKE EDITING FOR DIGITAL CONTENT

BACKGROUND won Digital content creation systems support a variety of functionality to both casual users and creative professionals in support of creation and editing of digital content. An example of this functionality relates to creation and editing of strokes. A user interface of the digital content creation system, for instance, is configured to receive an input via a cursor control device, gesture, stylus, and so forth that specifies a stroke, e.g., as a drawn freeform line. A variety of attributes are specified as part of the stroke to define display characteristics, such as a width, rounding, smoothing, color, brush type, pattern, and so forth.

In this way, the stroke as drawn in the user interface is configurable to compose a variety of digital content configurations, such as freeform sketches, objects, and so forth in ways that mimic use of real-world implements, e.g., brushes, pencils, etc. However, conventional techniques used to implement stroke functionality rely on a user's ability to provide accurate inputs and limit techniques that are usable to provide these inputs. These limitations and challenges result in slower workflows thereby hindering user interaction and operation of devices that employ this functionality.

SUMMARY

Constrained stroke editing techniques for digital content are described. In these examples, a stroke constraint system is employed as part of a digital content creation system to manage input, editing, and erasure (i.e., removal) of strokes via a user interface as part of editing digital content. To do so, locations and/or attributes of a displayed stroke are used to constrain locations and/or attributes of an input stroke.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
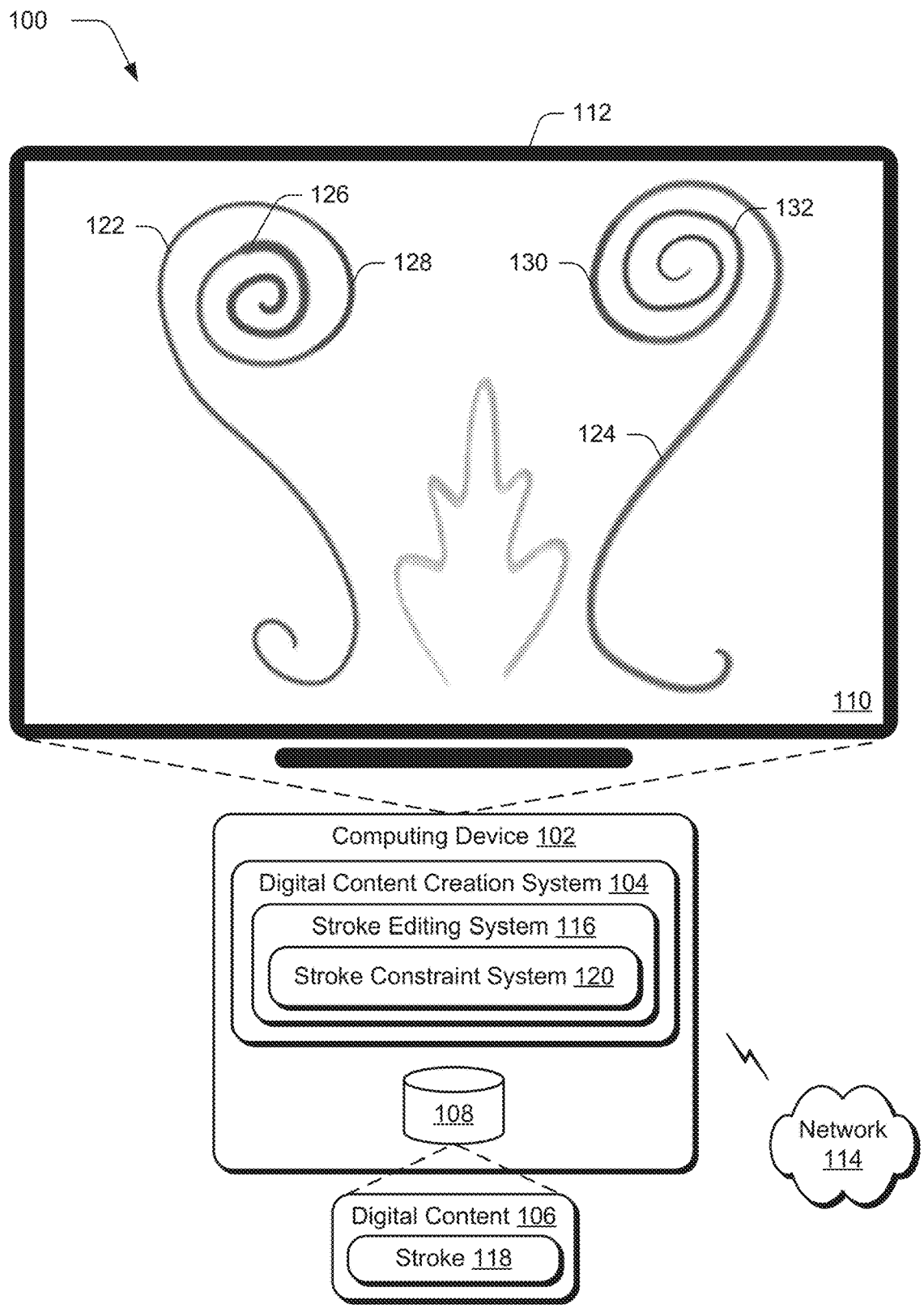
FIG. 1 is an illustration of a digital medium environment in an example implementation that is operable to employ constrained stroke editing techniques for digital content.

Strokes are an integral part of digital content creation. Strokes, for instance, are employed by a digital content creation system to mimic use of real-world implements, e.g., pencils, pens, highlighters, brushes, etc. This supports a user's ability to intuitively form digital content through readily understood use of this functionality. In one example, a user input is received using a cursor control device, gesture, stylus, and so on via a user interface to input strokes as having attributes that define a variety of different display characteristics, e.g., stroke width, color, pattern, and so forth.

In conventional implementations, however, flexibility permitted by digital content creation systems to create strokes limits an ability to subsequently edit these strokes, especially in instances in which the strokes are generated as raster objects, e.g., as bitmaps. For example, conventional techniques used to change, edit, add to, or erase strokes using conventional techniques once rendered as a bitmap are limited by a user's ability to manual recreate and follow the displayed stroke in order to overwrite the stroke to make changes. Rich functionality that is continually developed to increase realism and flexibility further complicates this ability. In one such example, a user input provided via a stylus that employs pressure and tilt along with location to input a stroke further complicates a user's ability to recreate this stroke to address each of these parameters and how the parameters are input. This hinders both user interaction and operation of underlying computing devices that implement these techniques.

Accordingly, constrained stroke editing techniques for digital content are described. In these examples, a stroke constraint system is employed as part of a digital content creation system to manage input, editing, and erasure (i.e., removal) of strokes via a user interface as part of editing digital content. As a result, the techniques described herein support stroke combinations, editing, and enhanced content creation workflows that are not possible using conventional techniques and improve operation of computing devices that implement these techniques through increased input accuracy.

In one such example, a stroke editing system of a digital content creation system receives inputs via a user interface to input strokes. The inputs, for instance, are specified via a cursor control device, detected using touchscreen functionality as a gesture, through use of a stylus, and so forth to draw the strokes as lines (e.g., freeform lines, paths) in a user interface. In response, the stroke editing system stores stroke points that define a continuous series of locations of the stroke (e.g., as an array) within the digital content and attributes that define display characteristics associated with those points. The attributes, for instance, are usable to specify stroke attributes such as color, weight, style (e.g., brush type), smoothing between points, roundness, and so forth. The attributes are also configurable to include stylus attributes, such as pressure and/or tilt of a stylus used to input the strokes that are used to control amounts of the stroke attributes, e.g., opacity, width, etc. The strokes in this example are then rendered as raster objects (e.g., bitmaps) in the user interface.

A selection input is then received selecting one of the displayed strokes in the user interface that is to be edited, e.g., to change attributes, erase all or a portion of the stroke, and so forth. The selection input, for example, is received by a "tap" or "click" via the user interface. In response, a stroke constraint system locates a displayed stroke that is to be used as a basis for editing the digital content, e.g., based on proximity of stroke points of the strokes to the selection input, temporal proximity (e.g., based on an input order of the strokes to select a "most recent" stroke), and so forth. This functionality is also performable between layers in the digital content 106, e.g., the displayed stroke is in a first layer and the input stroke is in a second layer that is different than the first layer.

Once selected, a point tracking module is employed to map input points used to define an input stroke to the stroke points of the selected stroke. This is usable, for instance, as part of a one-to-many mapping, many-to-one mapping, many-to-many mapping, and so forth to address disparities in a number of stroke points used to define a displayed stroke and a number of input points used to define the input stroke. For example, a number of points used by a stylus to define a stroke are typically five to ten times greater than a number of points used as part of a gesture to define a similar stroke. This functionality is also usable to address disparities caused by differences in input speed (e.g., how fast a stroke is drawn) and corresponding number of points resulting from those differences.

In an implementation, a mode selection input is also received to specify how attributes and stroke points of a displayed stroke are to be used to guide and constrain an input stroke. Options, for instance, are displayable in a user interface and are selectable to initiate stroke constrained editing (e.g., "constrain to stroke") as well as how the constraints are to be implemented, e.g., "match stroke attributes," "match stylus attributes," and so forth. These options are usable to implement a variety of different functionality.

In a first example in which "constrain to stroke" is selected, solely, locations of input points of the input stroke are mapped to locations of stroke points of the displayed stroke. This is usable to add or remove points to form the input stroke as having locations (with respect to the digital content and/or the user interface) that coincide with locations of the displayed stroke. As a result, the input stroke is displayed as an overlay over the displayed stroke. The input stroke, however, has attributes used to define display characteristics based on the input stroke, e.g., color, thickness, opacity, style, and so forth. As a result, the input stroke acts as a clone of the displayed stroke to provide edits that follow locations the displayed stroke but provide different attributes.

In a second example, selection of "constrain to stroke" along with "match stroke attributes" causes the input stroke to both follow a location and selected attributes of the displayed stroke. In a third example, use of "match stylus attributes" adds to "constrain to stroke" (along with or separate from stroke attributes) use of stored inputs of pressure and/or tilt that are usable to control amounts of respective attributes, e.g., width, opacity, and so forth. This is usable, for instance, to harmonize different input types, such as to have a subsequent gesture leverage inputs of a previous stylus input. As such, use of stylus attributes is usable to support edits that are not possible in conventional techniques due to a user's inability to accurately recreate location, pressure, and/or tilt using a stylus in successive inputs.

Similar functionality is also usable to specify erase operations using the input stroke to erase corresponding portions of the displayed stroke. This is usable to map points as previously described as well as remove and/or change attributes at these mapped points, e.g., to follow locations, stroke attributes, and/or stylus attributes. The digital content editing system, in one example, includes a control to toggle between drawing of an input stroke as constrained by a displayed stroke or erasing corresponding portions and/or attributes of a displayed stroke based on the input stroke. In this way, the techniques described herein overcome conventional limitations caused by use of rasterized strokes in a user interface that are "destructive" and thus incapable of subsequent modification using conventional techniques. Further discussion of these and other examples is included in the following sections and shown in corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ constrained stroke editing techniques for digital content. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 13.

The computing device 102 is illustrated as including a digital content creation system 104. The digital content creation system 104 is implemented at least partially in hardware of the computing device 102 (e.g., using a processing device and computer-readable storage medium) to process and transform digital content 106, which is illustrated as maintained in a storage device 108 of the computing device 102. Such processing includes creation of the digital content 106, modification of the digital content 106, and rendering of the digital content 106 in a user interface 110 for output, e.g., by a display device 112. Examples of digital content 106 include digital images, digital documents, digital video, digital media, and so forth. Although illustrated as implemented locally at the computing device 102, functionality of the digital content creation system 104 is also configurable as whole or part via functionality available via the network 114, such as part of a web service or "in the cloud."

An example of functionality incorporated by the digital content creation system 104 to process the digital content 106 is illustrated as a stroke editing system 116. The stroke editing system 116 is configured to manage input, editing, and storage of a stroke 118 as part of digital content 106. A stroke 118 is configurable as a path (e.g., as a freeform line) defined using a plurality of points. The plurality of points specifies successive and sequential locations of the stroke 118 within the digital content 106. Attributes are also definable with respect to the points to define display characteristics of the stroke at those locations. Example of attributes include color, width (e.g., weight), patterns, arrowhead, scale, alignment, rounding, gradients, brushes, transparency modes, blending modes, meshes, and so forth.

In one example, the stroke 118 is generated as a raster object, e.g., a bitmap. A raster object is configurable as a matrix of pixels that are rendered for inclusion as part of the digital content 106. However, conventional use of raster objects to form the stroke 118 is "destructive" in that in conventional techniques data used as a basis to define and form the raster object is no longer available once rendered. Therefore, edits to these raster objects in conventional techniques are forced to manually mimic how the raster object was input, which is difficult if not impossible to be performed in complex scenarios, e.g., through use of a stylus to recreate tilt and pressure values along with accurate recreation of points defining locations of an edit.

Accordingly, the stroke editing system 116 includes a stroke constraint system 120 that is representative of functionality to aid stroke 118 editing and erasure. In the illustrated user interface 110, for instance, a first stroke 122 and a second stroke 124 are drawn and displayed in the user interface 110. In order to support edits as part of the strokes, the stroke constraint system 120 supports a variety of functionality to constrain subsequent input strokes based on strokes already displayed in the user interface 110.

A first subsequent stroke 126, for instance, is input through use of the stroke constraint system 120 over the first stroke 122, which changes both a color and width. A second subsequent stroke 128, on the other hand, matches width attributes of the first stroke 122 but changes the color. A similar edit is viewable by a third subsequent stroke 130 input as overlaying the second stroke 124 that matches a width and location but changes a color. A fourth subsequent stroke 132 has a width that is less than the width of the second stroke 124. Similar techniques are also usable to erase portions of the displayed strokes, further discussion of which is described in relation to FIG. 9. In this way, the stroke constraint system 120 overcomes the challenges of conventional techniques to improve user interaction and operation of computing devices that implement these techniques, further discussion of which is included in the following sections and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Constrained Stroke Editing

Figure 10:
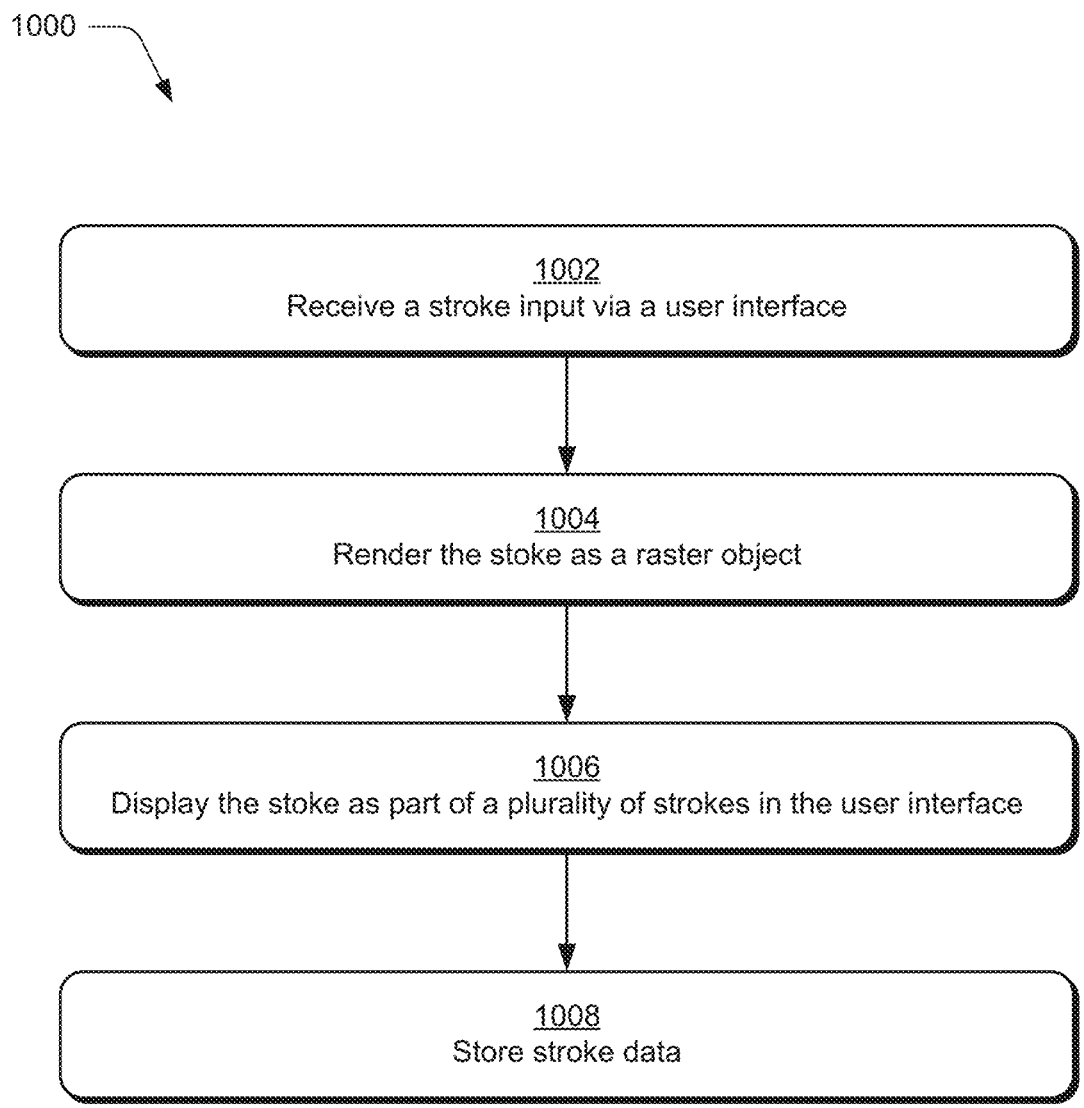
FIG. 10 is a flow diagram depicting a procedure in an example implementation of storing stroke data that is used to render a stroke as a raster object in a user interface as part of digital content.
Figure 11:
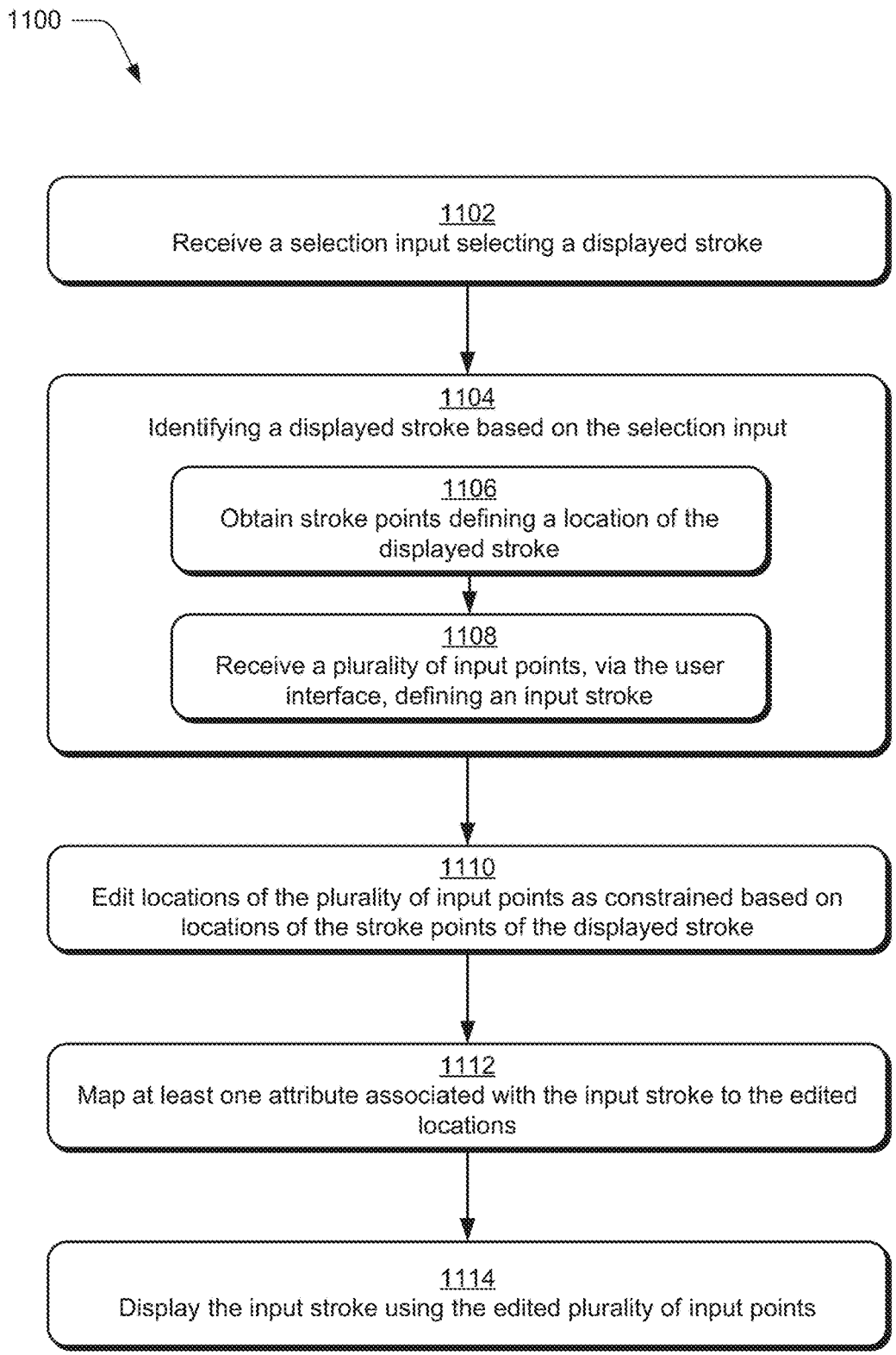
FIG. 11 is a flow diagram depicting a procedure in an example implementation of constrained stroke editing for digital content.

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-11. In the following discussion, reference is made in parallel between the systems and examples of FIGS. 2-9 and flow diagrams of the procedures 1000, 1100 of FIGS. 10 and 11.

Figure 2:
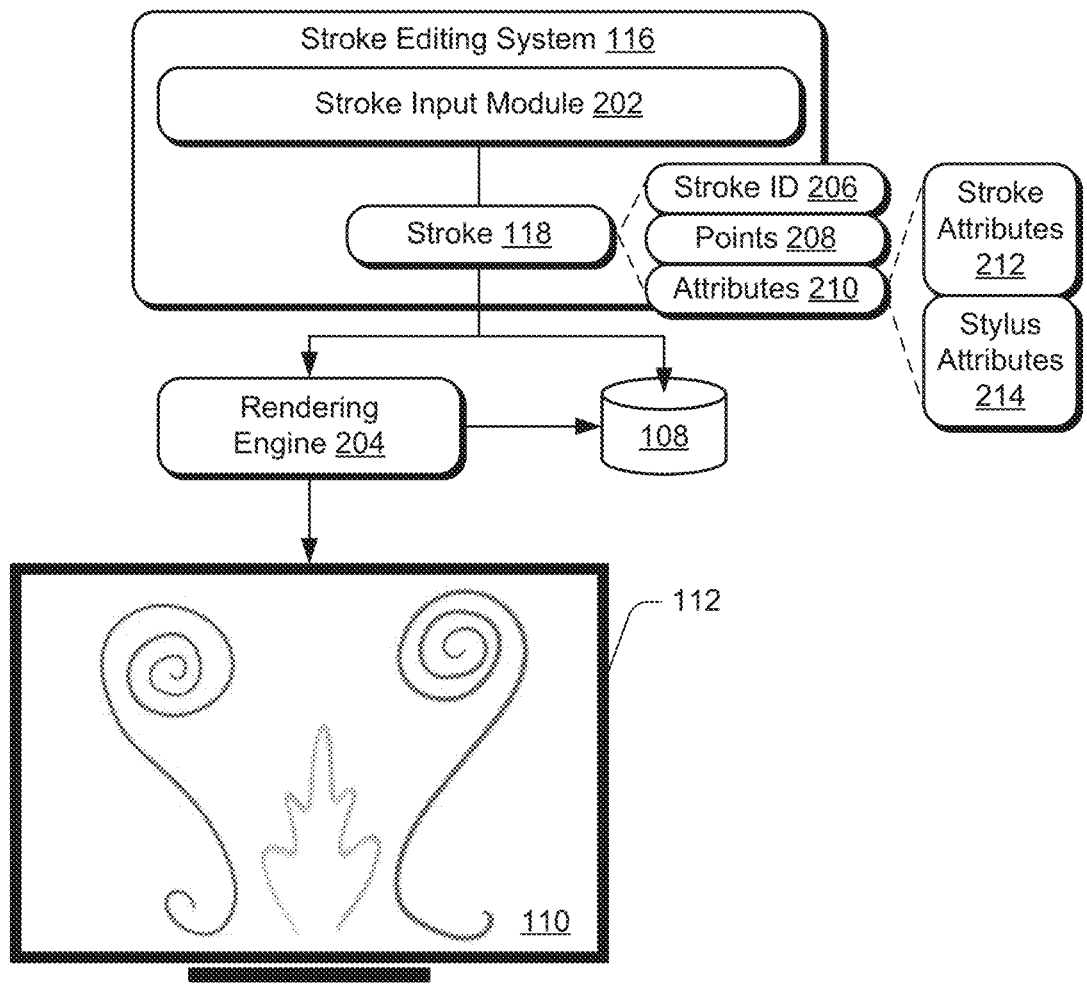
FIG. 2 depicts a system in an example implementation showing operation of the stroke editing system of FIG. 1 in greater detail as employing a stroke input module to input a stroke rendered as a raster object and also store stroke data that is used as a basis to define and render the stroke.

FIG. 2 depicts a system 200 in an example implementation showing operation of the stroke editing system 116 of FIG. 1 in greater detail as employing a stroke input module to input a stroke rendered as a raster object and also store stroke data that is used as a basis to render the stroke. A stroke input is received via a user interface (block 1002). A stroke input module 202, for instance, is configured to receive the stroke input as part of detecting interaction with a user interface 110 displayed by a display device 112. The stroke input is detectable in a variety of ways, examples of which include a cursor-control device (e.g., mouse, trackpad), gesture (e.g., detected using touchscreen functionality of the display device 112), stylus (e.g., active or passive), and so forth.

The stroke is rendered as a raster object (block 1004) and displayed as part of a plurality of strokes in the user interface (block 1006). A rendering engine 204, for instance, takes stroke data defining locations and attributes of the strokes and converts the stroke data into a raster object, e.g., as a bitmap. To do so, the stroke data, is rendered to a display buffer for display by the display device 112, e.g., as a bitmap. In conventional techniques, as previously described, rendering of the stroke is destructive.

A raster object, for instance, is configurable as a matrix of pixels that are rendered for inclusion as part of the digital content 106. Because of this, however, use of raster objects to form the stroke 118 is "destructive," in that, data used as a basis to form the raster object is no longer available once rendered in conventional techniques. Therefore, edits to these raster objects are forced to mimic input of the raster object as previously described, which is difficult if not impossible to be performed manually in complex scenarios.

In the techniques described herein, however, the stroke input module 202 is configured to store stroke data (block 1008) that provides a definition and basis for "how" the stroke is rendered to create the raster object. The stroke 118 in the illustrated example is associated with a stroke ID 206, points 208 that define locations (e.g., coordinates) along the stroke within the digital content 106 and thus define a shape of the stroke 118, and attributes 210 that define display characteristics, e.g., at the locations defined by the points 208. A first example of the attributes 210 include stroke attributes 212 that define display characteristics such as width (e.g., thickness), rounding, smoothing, color, brush type, pattern, gradient, opacity, and so forth.

In another example, the attributes 210 also include stylus attributes 214 which define how an implement provided the stroke inputs. To support this functionality, the stylus is configurable using active or passive functionality through reliance on "outside" sensors (e.g., a touchscreen) and/or use of sensors internal to the stylus, respectively. A stylus, for instance, is configurable to support pressure inputs, e.g., to control opacity, thickness, and so forth of corresponding attributes. The stylus is also configurable to support tilt attributes, e.g., which define an angle in three-dimensional space, in relation to a surface, and so forth.

In these examples, the stroke data has a complexity corresponding to a number of points 208 in the stroke, and thus improves data storage and processing efficiency as opposed to use of the raster object. Further, in an implementation the points 208 are stored after processing (e.g., smoothing) instead of using the points directly from the point tracking module of FIG. 4. This supports improved display characteristics involving subsequent edits based on these points as further described below.

In an implementation, stroke rendering is performed in two stages. The first stage is performed in real time as a stroke input is received as an approximation of the stroke. Once completed (e.g., completion of the gesture, release of cursor control device button), a final rendering is performed, e.g., to incorporate smoothing, curvature, and other considerations.

In another example, undo and redo operations are supported by maintaining the input positions and attributes, e.g., as stored in an array. This data is usable by an undo/redo engine to remove or redo portions of the input stroke and further defined below.

Figure 3:
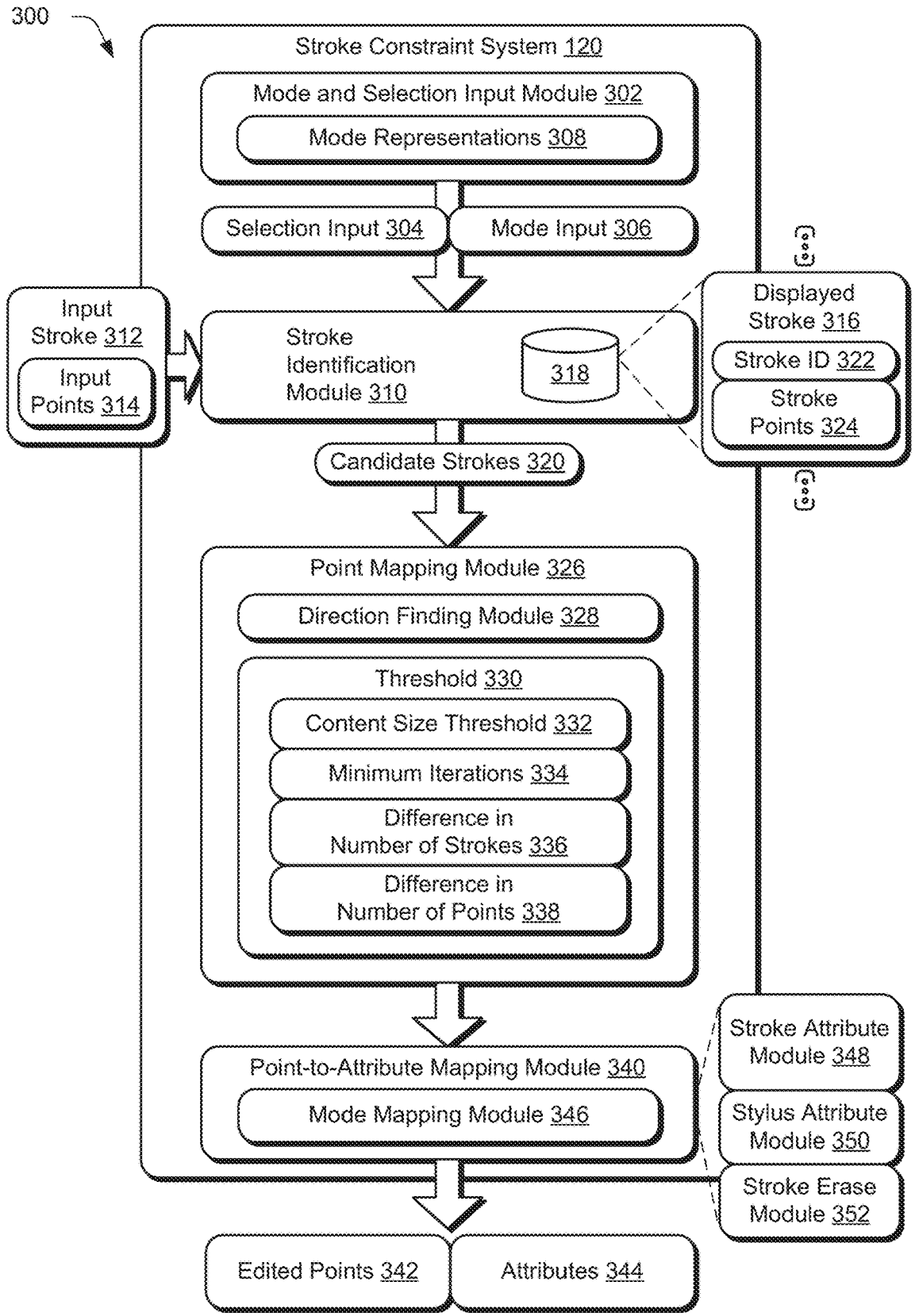
FIG. 3 depicts a system in an example implementation showing operation of a stroke constraint module of FIG. 1 in greater detail.

FIG. 3 depicts a system 300 in an example implementation showing operation of a stroke constraint module of FIG. 1 in greater detail. To begin in this example, a mode and selection input module 302 receives a selection input 304 (block 1102). The selection input 304 is detectable as a tap, drag, and so forth using a cursor control device, gesture, stylus, etc. through interaction with the user interface 110. A mode input 306 is also receivable through selection of mode representations 308 that represent types of modes to be used as part of constraining an input stroke, e.g., to match stroke attributes, match stylus attributes, toggle between draw and erase operations, and so forth as further described in relation to FIGS. 5-9.

The selection input 304 is then provided by the mode and selection input module 302 to a stroke identification module 310. The stroke identification module 310 is configured to receive the selection input 304 along with an input stroke 312 defined using input points 314. Based on these inputs, the stroke identification module 310 identifies candidate strokes 320 from a plurality of displayed strokes 316 based on the selection input 304. This is performed by the stroke identification module 310 using data stored in a storage device 318 that defines those strokes for rendering as previously described in relation to FIG. 2.

The displayed stroke 316, for instance, is associated with a stroke ID 322 and is defined using stroke points 324. To identify which of the plurality of displayed strokes 316 based on the selection input 304 (block 1104) are candidate strokes 320, the stroke identification module 310 examines input points 314 of the input stroke 312, e.g., in comparison with the stroke points 324 of the displayed strokes 316.

Figure 4:
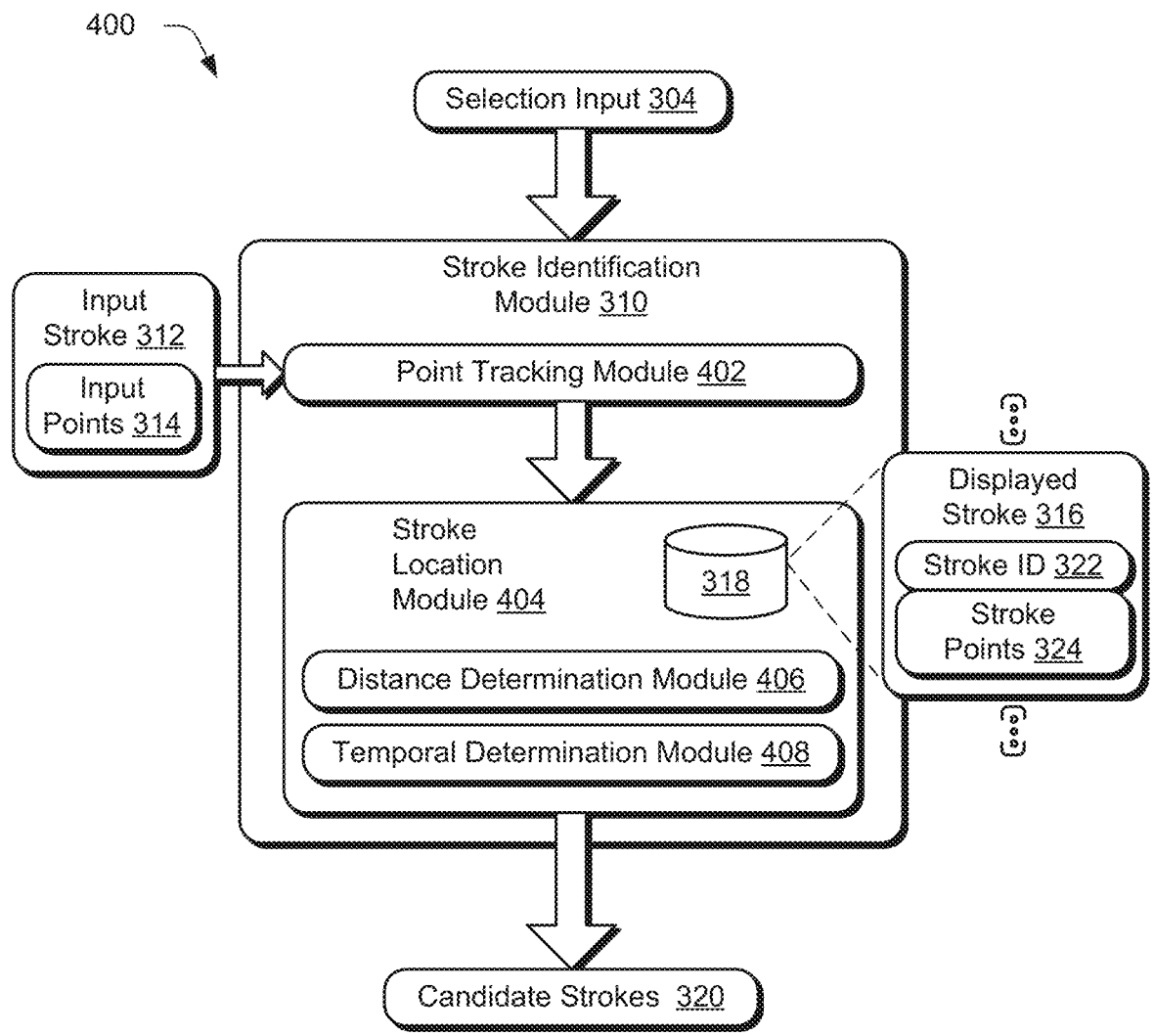
FIG. 4 depicts a system in an example implementation showing operation of the stroke identification module of FIG. 3 in greater detail as identifying candidate strokes based on a selection input.

FIG. 4 depicts a system 400 in an example implementation showing operation of the stroke identification module 310 of FIG. 3 in greater detail as identifying candidates strokes 320 based on a selection input 304. The stroke identification module 310 includes a point tracking module 402 and a stroke location module 404. The stroke location module 404 obtains stroke points 324 defining a location of a displayed stroke 316 (block 1106) in the user interface 110. The point tracking module 402 receives a plurality of input points 314, via the user interface, defining an input stroke 312 (block 1108).

The selection input 304 is used as a basis to initiate the determination of which of the displayed strokes 316 qualify as candidate strokes 320. This is performable as a dedicated input (e.g., a tap, drag) or as one or more initial input points 314 of the input stroke 312. A variety of considerations are usable by the stroke location module 404 to select the candidate strokes 320, examples of which are illustrated as a distance determination module 406 and a temporal determination module 408.

The distance determination module 406 is configured to determine which stroke points 324 are closest (e.g., based on Euclidean square distance) to the selection input 304. The temporal determination module 408 is configured to select stroke points 324 and corresponding displayed strokes 316 based on temporal considerations, e.g., based on an order of how recent the stroke points 324 and corresponding displayed strokes 316 are input into the stroke constraint system 120. These considerations are used by the stroke location module 404 to weigh the stroke points 324 and corresponding displayed strokes 316 for selection as candidate strokes 320, which are then output to a point mapping module 326.

The point mapping module 326 is configured to edit locations of the input points as constrained based on location of the stroke points of the displayed stroke (block 1110). To do so, the point mapping module 326 utilizes a direction finding module 328 and one or more thresholds 330. The direction finding module 328 is configured to determine a direction in an ordering of the stroke points 324 of the candidate strokes 320 (e.g., ordered in an array) and progress through the ordering as part of mapping input points 314 to the stroke points 324.

A content size threshold 332, for instance, is used by the direction finding module 328 and is based on a distance of the stroke points 314 to the selection input 304 in relation to an overall display size of the digital content 106. In one example, the content size threshold 332 is calculated as a digital content 106 size dependent threshold for square distance comparison as follows:

Content_size_threshold=std::max(((int)self.ima-
geview.contentsize.width/kPixelDimension)*
((int)self.imageView.contentSize.height/
kPixelDimension),1500)

where "kPixelDimension=50" in one example is experimentally determined. Each stroke point 324 that is associated with a distance (e.g., as a Euclidean square distance) from the selection input 304 greater than this threshold is not further processed by the distance determination module 406, thereby conserving processing resources and improving computing device 102 operation. Otherwise, the stroke points 324 within this content size threshold 332 distance remain as candidates for further processing.

An initial set of the input points 314 are used by the direction finding module 328 to determine a direction in relation to an ordering of stroke points 324 of corresponding displayed strokes 316 to improve mapping accuracy. Continuing with the previous example, the content size threshold 332 is used to compare Euclidean square distances between the selection input 304 and the stroke points 324. In an implementation, a multiplication factor is used to address differences in an amounts of points based on whether an input source is a stylus or cursor control device versus a gesture. The direction finding module 328 then employs one or more thresholds 330 to determine the direction based on the input points 314. In a first example, a threshold is set for a number of minimum iterations 334 used to determine the distance, e.g., "kMinIterations." In a second example, a difference in a number of strokes 336 is defined as "abs(diff in number of forward minus number of reverse strokes." In a third example, a difference in number of points 338 via closeness is utilized.

To do so, the direction finding module 328 maintains a first array which stores the stroke points 324 of candidate strokes 320 by stroke ID 322 and defines start and end indices of corresponding candidate strokes 320 within the array. Once a displayed stroke is selected from the candidate strokes 320, a start and end index are determined, which is referred to as "Pass 1" in this example.

In an implementation, the direction finding module 328 selects stroke points 324 that are closest to the input points 314 in both directions, e.g., that are within initial start and end positions. In other words, a current input point 314 is compared with corresponding end points, and one of the end points is updatable with an index move as input points 314 are collected within the minimum iterations 334. If the minimum iterations 334 have been reached and neither of the difference in number of strokes 336 or difference in number of points 338 threshold criteria are met, the direction finding module 328 continues, e.g., as the input stroke 312 is likely stationary. Therefore, the direction finding module 328 executes Pass 1 until enough input points 314 are received to find a valid direction and determines a start and end of an order of the stroke points 324 based on that direction.

In a second pass (i.e., Pass 2), the direction finding module 328 then determines closeness to respective stroke points 324 and precedes in that order to map the input points 314 to the stroke points 324. The stroke points 324 for a selected displayed strokes 316, for instance, are ordered sequentially within an array. Therefore, the point mapping module 326 then maps the input points 314 sequentially to the stroke points 324 of the selected displayed stroke 316, i.e., proceeds one-by-one or one-to-many based on closeness in a direction determined by the direction finding module 328. In an instance in which a next stroke point 324 in the array is not closest to a respective input points 314, that point is ignored and thus protects against visual artifacts and improves accuracy.

Once the input points 314 are edited based on the stroke points 324, at least one attribute associated with the input stroke 312 is mapped to the edited locations (block 1112) by a point-to-attribute mapping module 340. This results in an output of edited points 342 having a change in location of the input points 314 based on the stroke points 324 and attributes 344, which are then output for rendering by the rendering engine 204 and displayed as the input stroke 312 (block 1114). In an implementation, this causes the input stroke 312 to be displayed as overlapping the displayed stroke 316 in the user interface 110. This is usable to support a variety of functionality.

As previously described, the mode and selection input module 302 support a mode input 306 through selection of one or more mode representations 308. The mode selections are usable by a mode mapping module 346 to specify how stroke data stored for the displayed strokes 316 is used in conjunction with the input stroke 312. Illustrated examples of this functionality are represented as a stroke attribute module 348, stylus attribute module 350, and stroke erase module 352, operation of which are further described in the following discussion.

Figure 5:
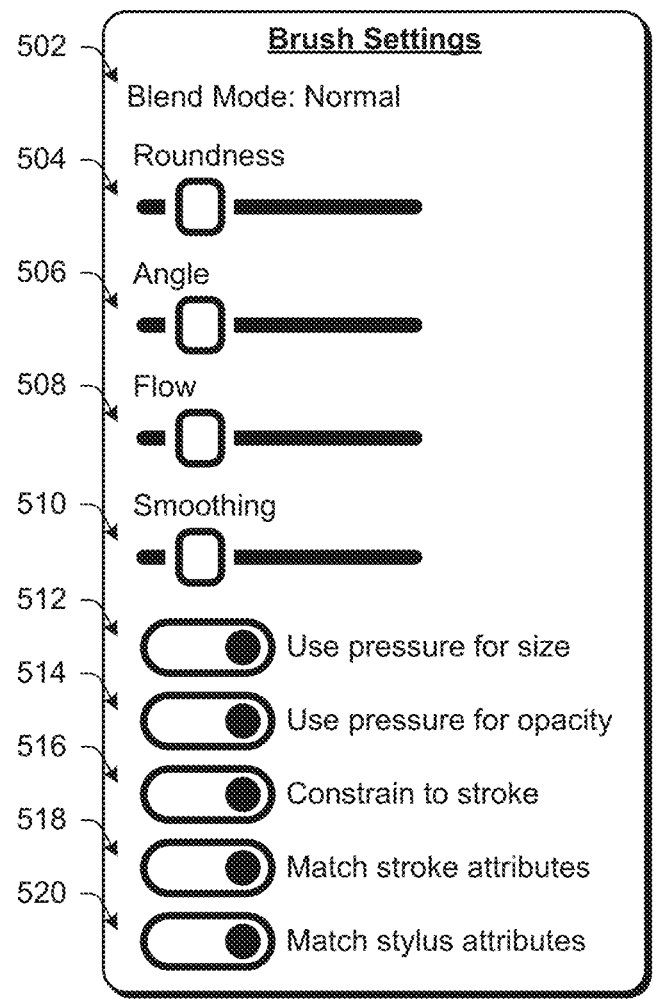
FIG. 5 depicts an example of a brush settings user interface operable to receive user input to set attributes and select modes in support of constrained stroke editing.

FIG. 5 depicts an example of a brush settings user interface 500 operable to receive user input to set attributes and select modes in support of constrained stroke editing. The brush setting user interface 500 includes representations that are selectable via a slider control to specify amounts of respective attributes to be used for an input stroke 312. Examples of this functionality include blend mode 502, roundness 504, angle 506, flow, 508, and smoothing 510. Other examples are also contemplated, including attributes described above for opacity, pattern, brush type, and so forth. In this way, user inputs are configured to specify display characteristics of the input stroke 312 to be rendered and displayed in the user interface 110.

The brush settings user interface 500 also includes mode representations 308 that are selectable to select modes that control how input points 314 of an input stroke 312 are constrained based on stroke points 324 and associated attributes of a displayed stroke 316. Examples of this include functionality to specify an input type (e.g., pressure) is used to control amounts of corresponding attributes, e.g., to "use pressure for size" 512 and/or "use pressure for opacity" 514 as detected using a stylus, touchscreen functionality of the display device 112, and so forth. Additional representations include functionality to initiate the "constrain to stroke" 516 functionality. This functionality is usable in conjunction with functionality to "match stroke attributes" 518 and "match stylus attributes" 520.

Figure 6:
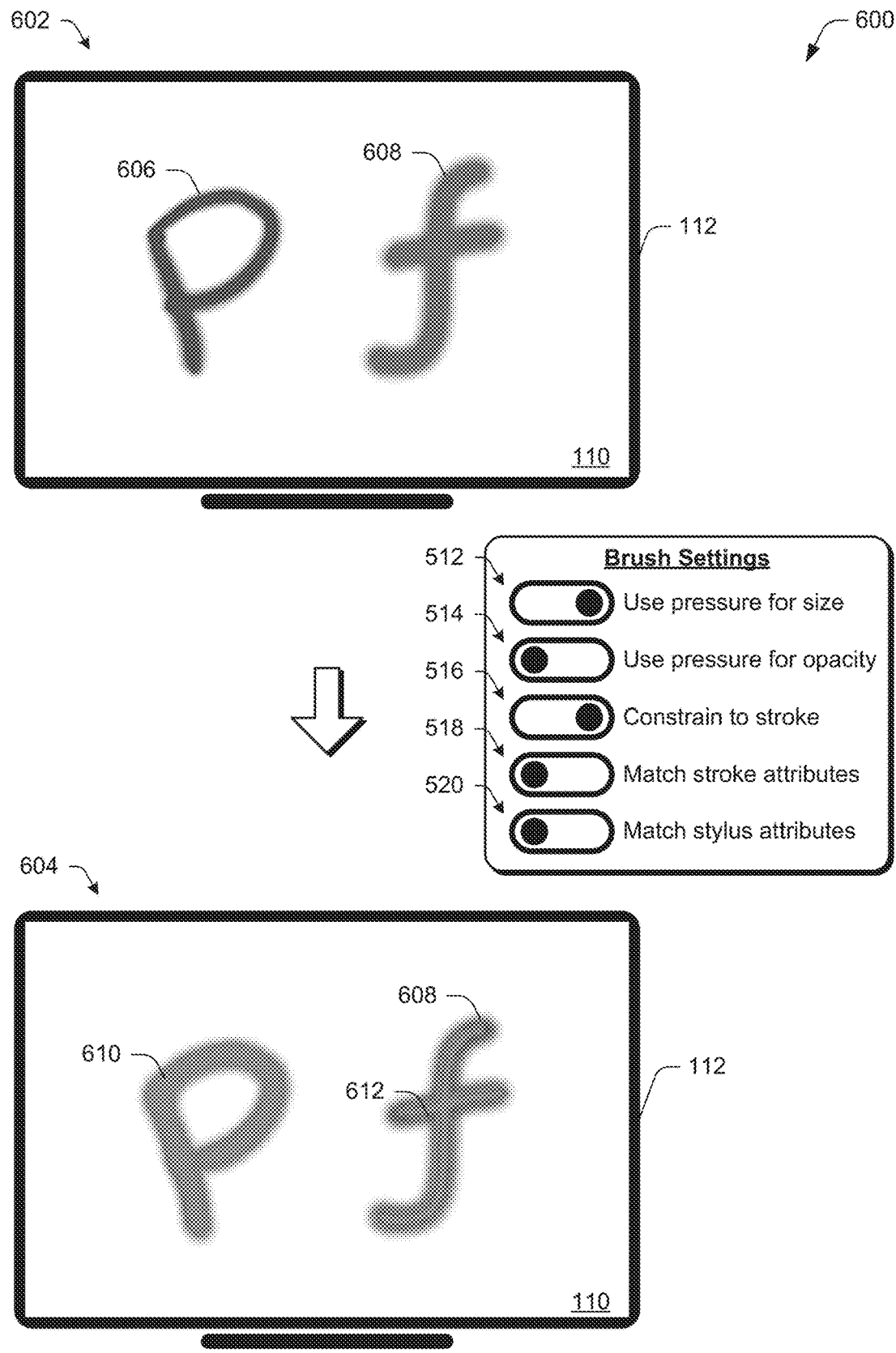
FIG. 6 depicts an example implementation of constrained stroke editing in which "constrain to stroke" functionality is selected.

FIG. 6 depicts an example implementation 600 of constrained stroke editing in which constrain to stroke 516 functionality is selected. This example implementation 600 is illustrated using first and second stages 602, 604.

At the first stage 602, first and second displayed strokes 606, 608 are rendered and displayed in a user interface 110 by a display device 112. Inputs are received that select "constrain to stroke" 516 as well as "use pressure for size" 512. Accordingly, first and second input strokes 610, 612 are constrained to locations of the first and second displayed strokes 606, 608 having sizes (i.e., thickness, width) based on an amount or pressure detected, e.g., from a stylus.

For the first input stroke 610, this causes a width that overwrites an underlying first displayed stroke 606 so that it is no longer viewable. On the other hand, the second input stroke 612 has a smaller width in comparison with the second displayed stroke 608 such that these strokes are viewable together in the user interface 110.

Figure 7:
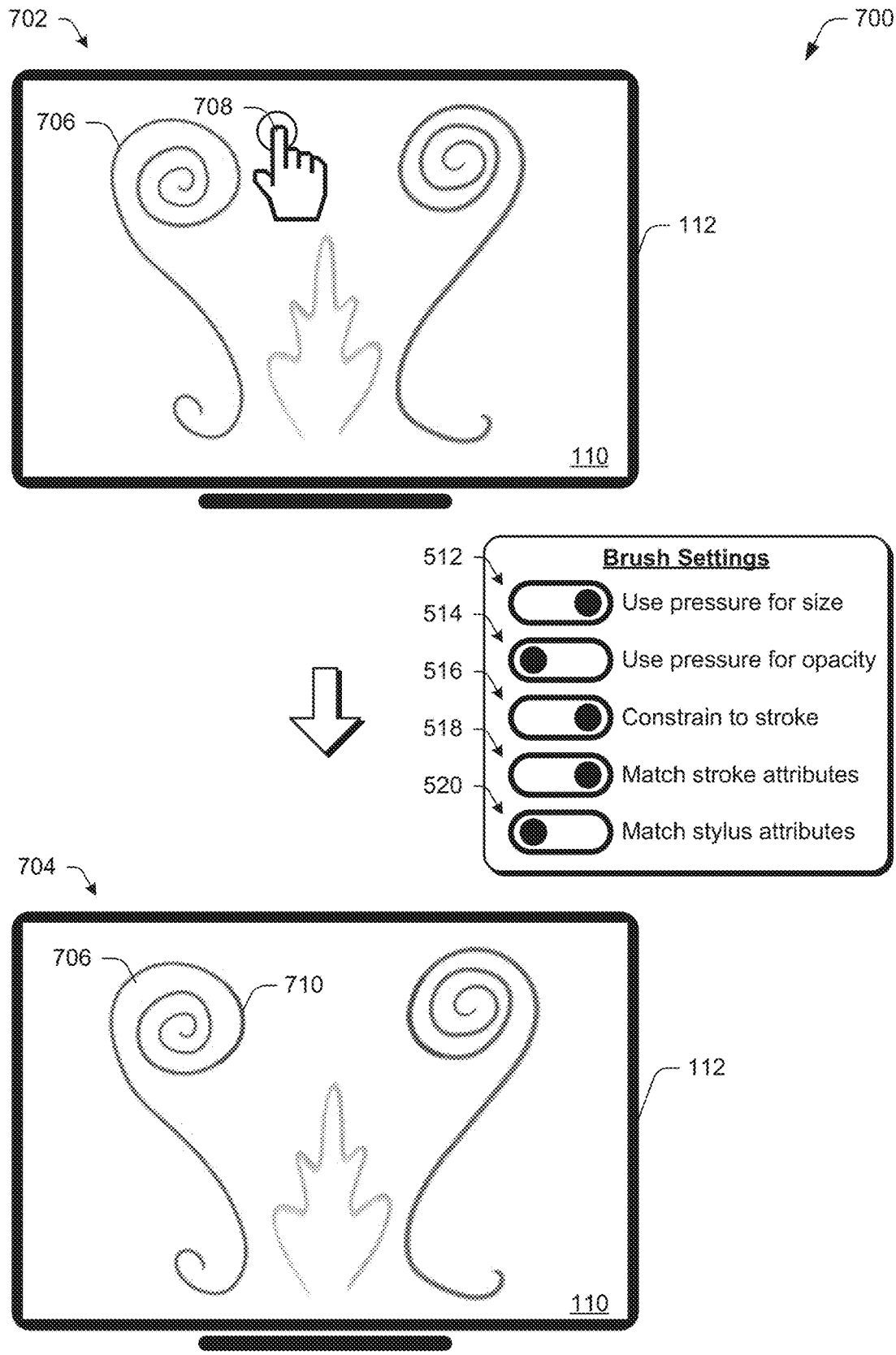
FIG. 7 depicts an example implementation of constrained stroke editing in which "constrain to stroke" functionality is selected along with "match stoke attributes" functionality.

FIG. 7 depicts an example implementation 700 of constrained stroke editing in which constrain to stroke 516 functionality is selected along with match stoke attributes 518 functionality. This example implementation 700 is also illustrated using first and second stages 702, 704. This functionality operates as an extension to the previous example of FIG. 6 by supporting a user's ability to match stroke attributes (e.g., brush size, opacity, roundness, flow, etc.) while changing other attributes, such as brush type and color.

As shown at the first stage 702, a selection input is received to select a first displayed stroke 706. A user input 708 is then received (e.g., a threshold distance away from the selected stroke) which supports output of a menu to specify particular attributes of the first displayed stroke 706. The menu, for instance, includes values of attributes of the first displayed stroke 706, which are then changeable via a subsequent user input, e.g., to change a color. The input stroke 710 is then rendered and displayed in the user interface 110 based on these selections as shown at the second stage 704.

Figure 8:
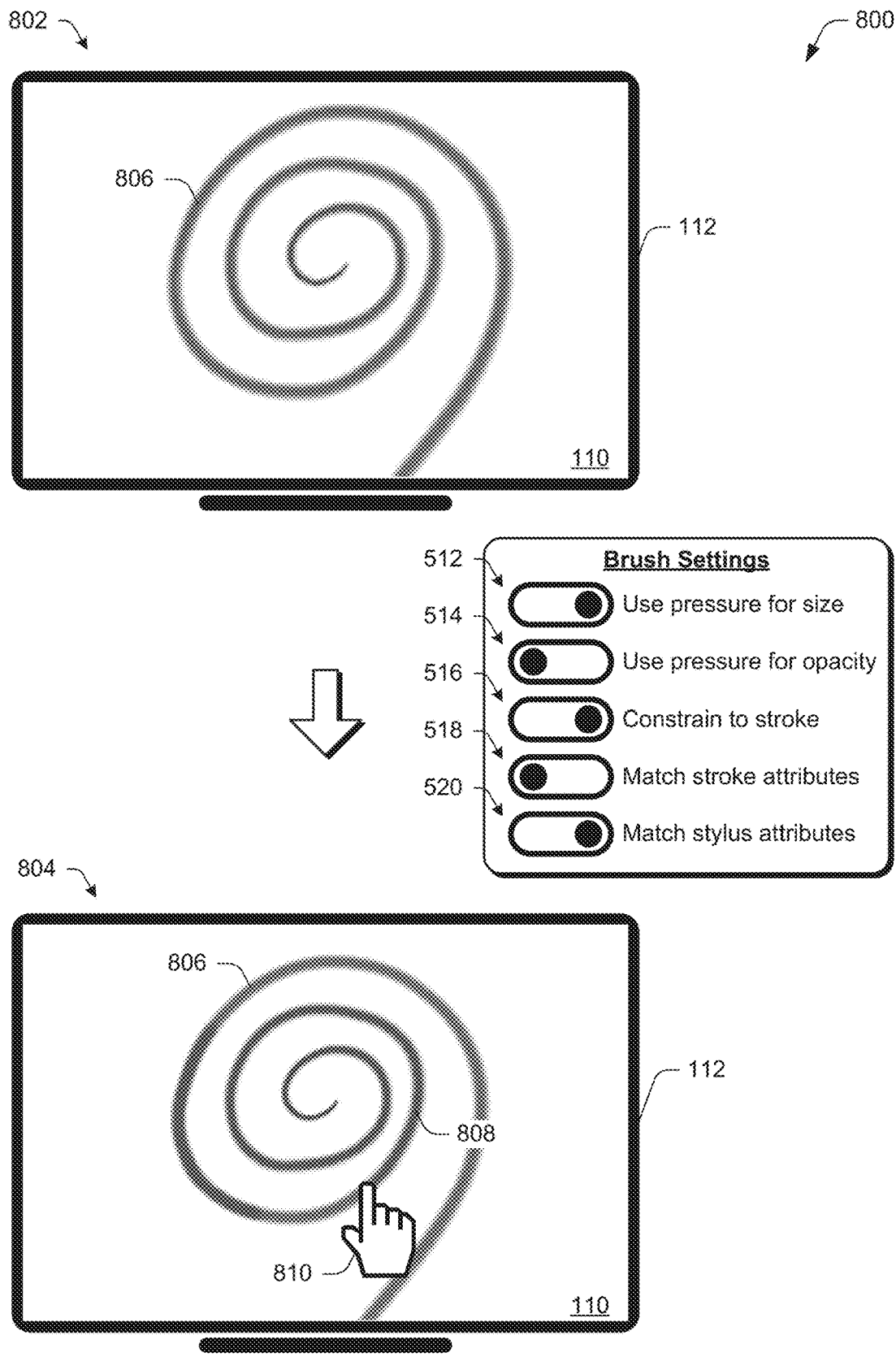
FIG. 8 depicts an example implementation of constrained stroke editing in which "constrain to stroke" functionality is selected along with "match stylus attributes" functionality.

FIG. 8 depicts an example implementation 800 of constrained stroke editing in which constrain to stroke 516 functionality is selected along with match stylus attributes 520 functionality. This example implementation 800 is likewise illustrated using first and second stages 802, 804. Match stylus attributes 520 functionality is usable to constrain inputs to inputs that are stored as stylus attributes 214 as part of stroke data of the stroke 118. This supports an ability to leverage previous input types supported by a particular type of implement, even if that functionality is not currently available.

At the first stage 802, a displayed stroke 806 is rendered that is input using a stylus, and as such tilt and pressure parameters are used to specify amounts of respective attributes used to define the stroke. By selecting match stylus attributes 520, these amounts and corresponding attributes are made available for generating an input stroke 808. This is shown in the second stage 804 using a gesture 810, which as previously describe is typically implemented as having decreased accuracy in comparison with a stylus. In this way, functionality of the constrained stroke editing system is expanded and improves corresponding device operation to scenarios that are otherwise not supported by underlying functionality of the computing device.

Figure 9:
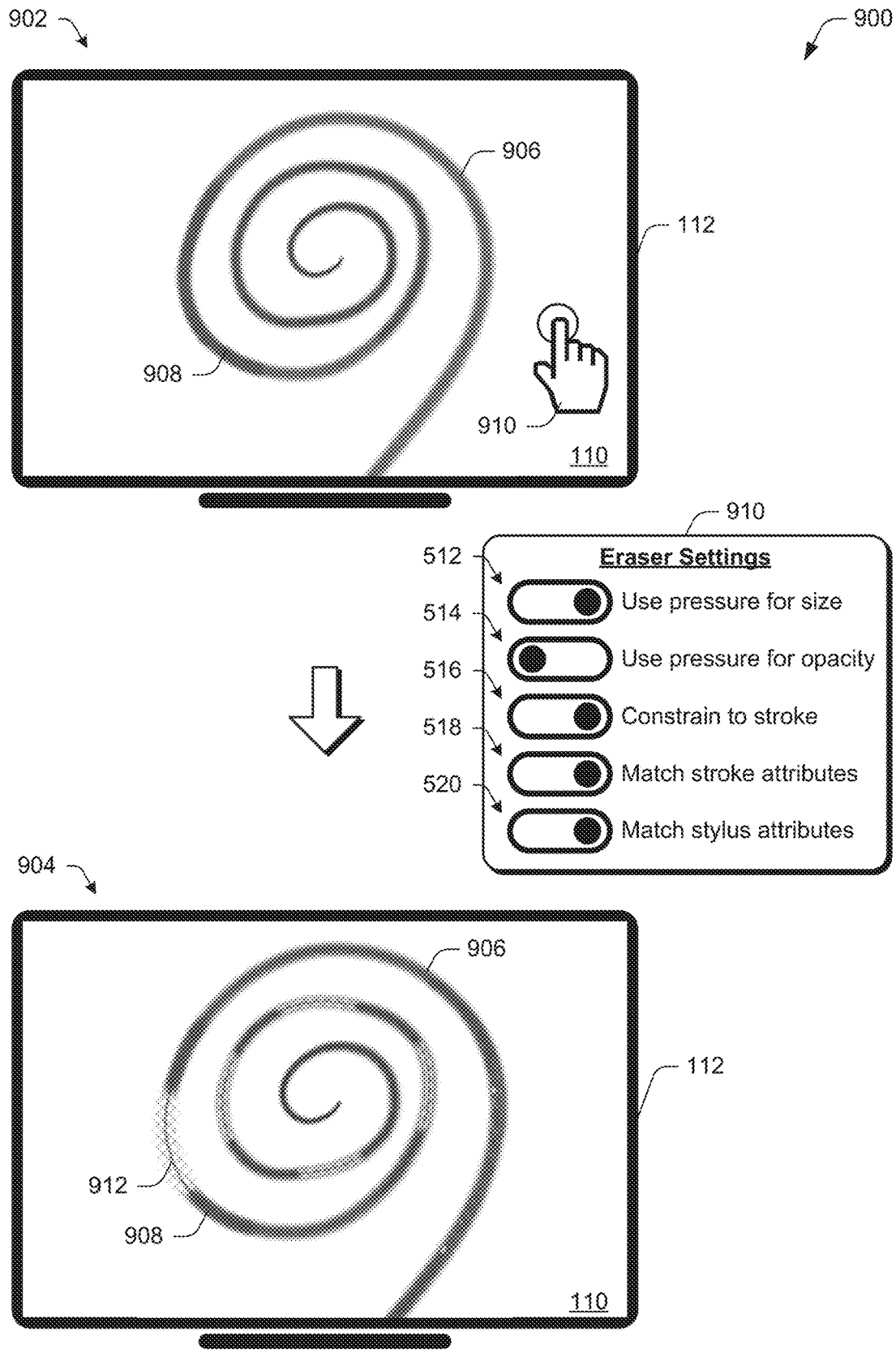
FIG. 9 depicts an example implementation of constrained stroke editing in which "constrain to stroke" functionality is selected to erase portions of a displayed stroke.

FIG. 9 depicts an example implementation 900 of constrained stroke editing in which constrain to stroke 516 functionality is selected to erase portions of a displayed stroke. This example implementation 900 is illustrated using first and second stages 902, 904. Use of an erase operation expands functionality of the previous edit operations by support an ability to erase portions of displayed strokes and/or adjust attributes of those strokes.

In an implementation, eraser settings 910 are implemented as a type of brush functionality in that stroke and stylus attributes are used. But in this instance, erasure is used to replace pixels with "empty" pixels which are constrained based on the attributes of the constrained strokes. In this way, the techniques described herein are configured to leverage attributes of the constrained strokes, automatically and without user intervention. Further, these techniques are also usable as part of creating new art forms through individualized adjustment of these attributes, e.g., the attributes are individually user selectable to achieve desired results as part of replacing the pixels as part of an erase operation.

As shown at the first stage 902, a displayed stroke 906 and an input stroke 908 that is constrained by the displayed stroke 906 is output in the user interface 110. Erase functionality is initiated (e.g., as a gesture 910 as part of a keyboard-less modifier) as a transient tool to toggle between a constrained edit mode and a constrained erase mode.

As shown at the second stage 904, this causes output of an erase representation 912 (e.g., as a thin vector) along a selected portion of the stroke to be erased. This provides feedback to indicate selection of corresponding portions of corresponding strokes in the user interface 110. When in the erase mode, the match stroke attributes 518 and match stylus attributes 520 functionality is leveraged to remove the corresponding attributes and respective amounts of those attributes. Other examples are also contemplated, such as to support edits through attribute and point removal.

Functionality used to support erase operations differs from the functionality used to support the brush edit operations above, e.g., attributes such as opacity and flow are not matched otherwise the erase operation cannot be performed. Accordingly, in one example constrained stroke editing techniques when used as part of an edit operation are usable to match each of the attributes of the displayed stroke in order to "set it back" to previous attributes after the constrained stroke is completely.

Another example is also implemented in which the erase operations are configured to change one or more attributes of the displayed stroke. As described above, a selection input (e.g., a first tap) on a displayed stroke causes selection of a displayed stroke. Another input (e.g., another tap) causes output of representations and values of each of the attributes of that stroke.

In an implementation example, a start and end index of each displayed stroke 316 along with stroke points 324 are stored in a stroke-start-indices stack, attribute information for respective stroke points is stored in another stack. Because constrained strokes are implemented as strokes over existing strokes, the stroke points and corresponding attribute information is not stored in one example to conserve data storage resources and protect against conflicts, although other examples involving storage are also contemplated.

In an example of an edit operation, when an input stroke is received as part of an erase operation, a start and end index pair are added to the above array. On "undo," a top item is taken out from the stroke-start-indices stack and added to a stroke-start-indices-undone stack. On redo, a top of the stroke-start-indices-undone stack is taken out and pushed into a stroke-start-indices stack. However, to optimize, constrained stroke relation point data is not stored as described above. The stroke constraint system 120 maintains undo/redo states to history data even for constrained strokes, e.g., both edits and erases. This is performed by adding a dummy value pair {−1, +1} of start and end indices into the stroke-start-indices stack when a constrained input stroke is added that is usable to define the stroke for rendering by a rendering engine.

In an implementation, support is also added beyond a current editing session to support leveraging of edits performed over a lifetime of the digital content 106. Accordingly, other events (e.g., points and attributes) are added to an undo/redo stack in a core of the digital content 106 by the stroke constraint system 120 for use by an undo/redo engine, which are configurable to include a dummy value pair for these also. Therefore, each time an input stroke is received in this example, a stroke-start-indices-temp array is created. On a "do" (i.e., edit) operation, a check is made as to whether this is not empty and is added to stroke-start indices. If empty, dummy strokes are added. A variety of other examples are also contemplated.

Figure 12:
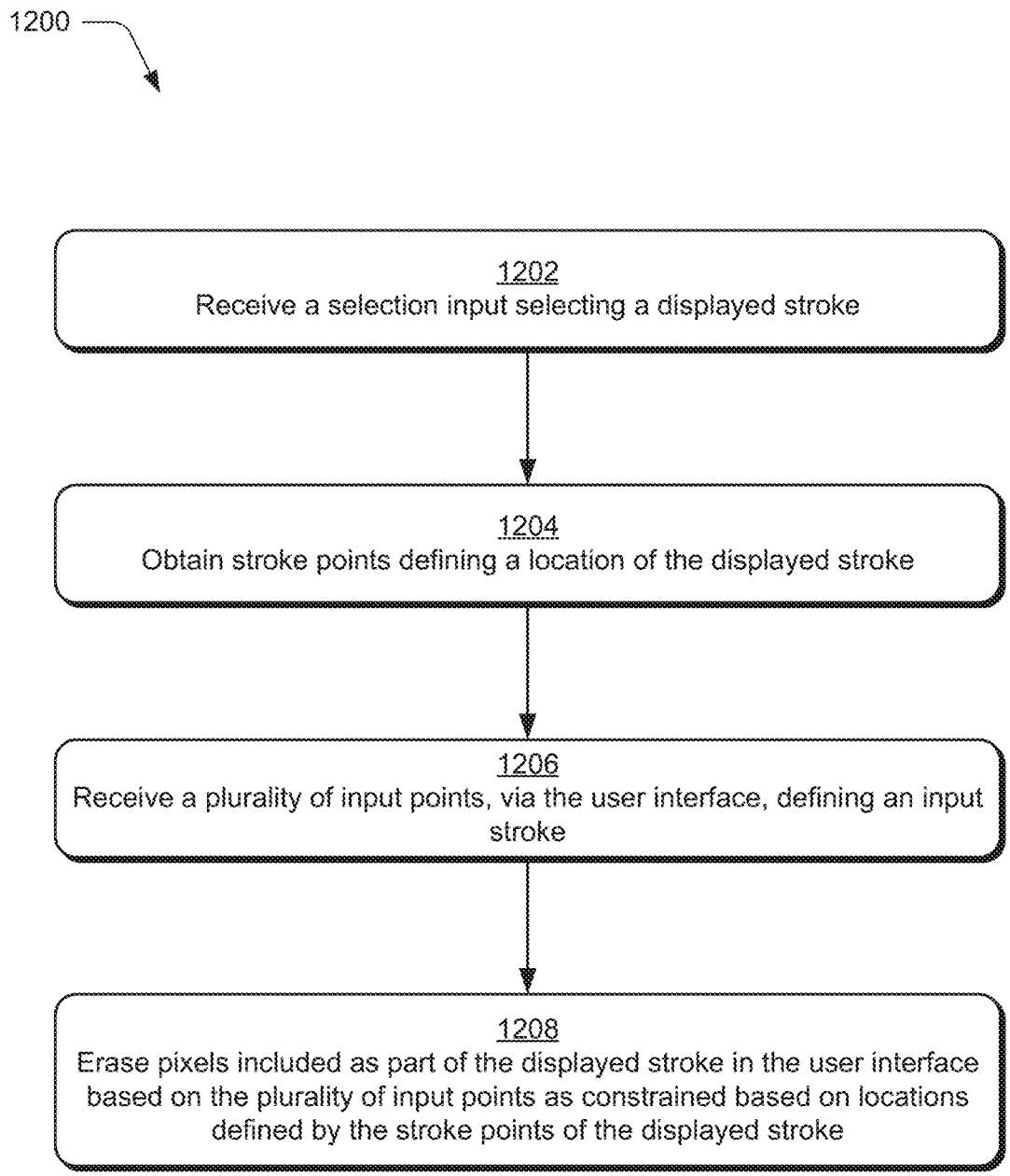
FIG. 12 is a flow diagram depicting a procedure in an example implementation of an erase operation.

FIG. 12 depicts a procedure 1200 in an example implementation of an erase operation. The erase operation is a type of edit operation in which pixels of a displayed stroke are removed or further edited while being constrained using the techniques previously described. Accordingly, a selection input is also received in this example as selecting a displayed stroke in a user interface (block 1202). In response, stroke points defining locations of the displayed stroke in the user interface are obtained (block 1204) and a plurality of input points are received via the user interface, the input points defining an input stroke (block 1206).

In this example, however, pixels are erased that are included as part of the displayed stroke in the user interface based on the plurality of input points as constrained based on locations defined by the stroke points of the displayed stroke (block 1208). To do so, brush techniques similar to those above are used to display "empty" pixels that do not have display attributes, e.g., colors, gradients, and so forth, that are constrained based on the attributes of the displayed stroke. In this way, the techniques described herein overcome challenges involved in manual conventional techniques. Further, as described above, new art forms are support through display of an option in the user interface to specify which attributes of a displayed stroke are to be matched, an example of which is shown in FIG. 5.

Example System and Device

Figure 13:
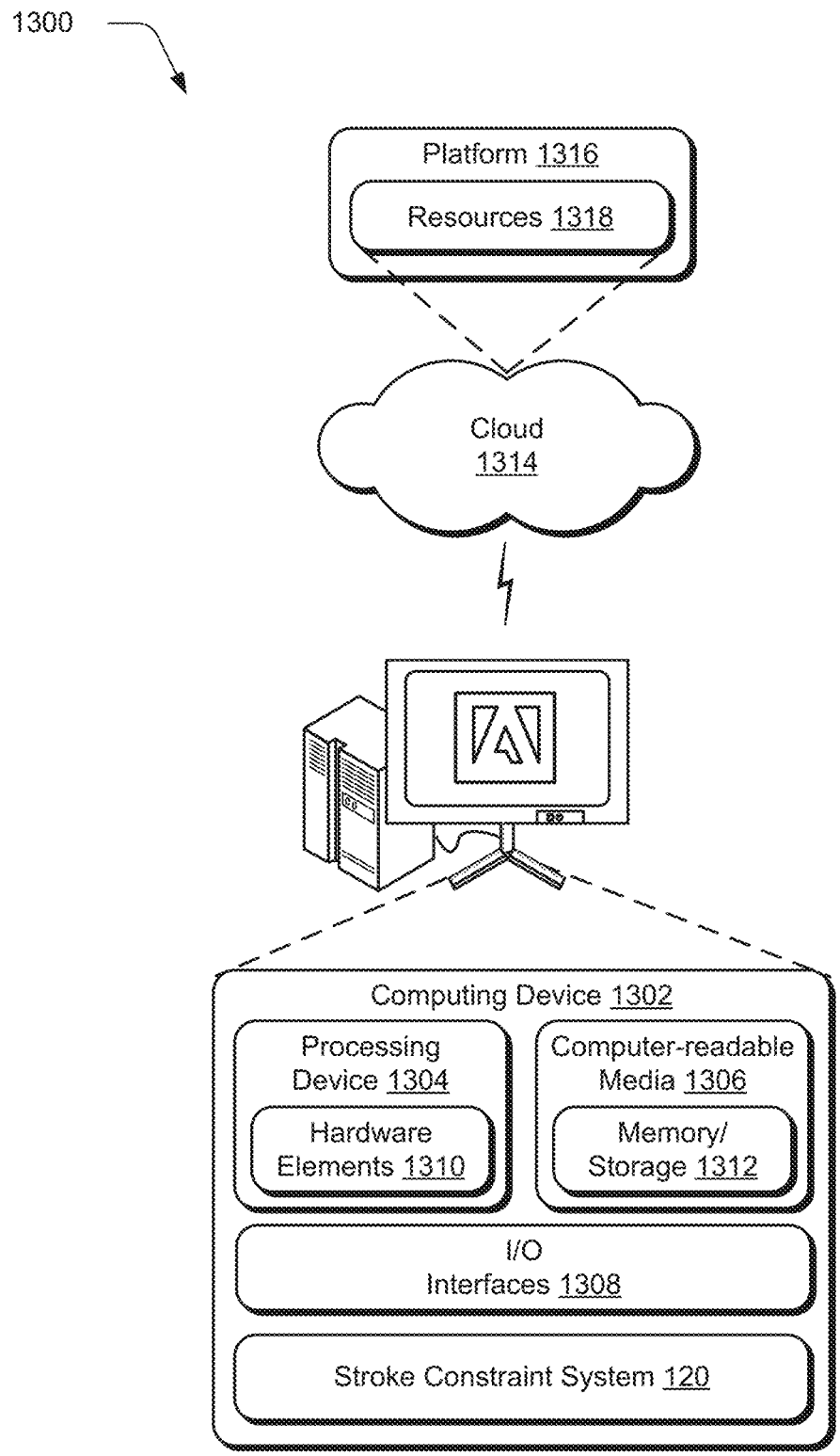
FIG. 13 illustrates an example system including various components of an example device that can be implemented as any type of computing device as described and/or utilize with reference to FIGS. 1-12 to implement embodiments of the techniques described herein.

FIG. 13 illustrates an example system generally at 1300 that includes an example computing device 1302 that is representative of one or more computing systems and/or devices that implement the various techniques described herein. This is illustrated through inclusion of the stroke constraint system 130. The computing device 1302 is configurable, for example, as a server of a service provider, a device associated with a client (e.g., a client device), an on-chip system, and/or any other suitable computing device or computing system.

The example computing device 1302 as illustrated includes a processing device 1304, one or more computer-readable media 1306, and one or more I/O interface 1308 that are communicatively coupled, one to another. Although not shown, the computing device 1302 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing device 1304 is representative of functionality to perform one or more operations using hardware. Accordingly, the processing device 1304 is illustrated as including hardware element 1310 that is configurable as processors, functional blocks, and so forth. This includes implementation in hardware as an application specific integrated circuit or other logic device formed using one or more semiconductors. The hardware elements 1310 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1306 is illustrated as including memory/storage 1312. The memory/storage 1312 represents memory/storage capacity associated with one or more computer-readable media. The memory/storage 1312 includes volatile media (such as random access memory (RAM)) and/or nonvolatile media (such as read only memory (ROM), Flash memory, optical disks, magnetic disks, and so forth). The memory/storage 1312 includes fixed media (e.g., RAM, ROM, a fixed hard drive, and so on) as well as removable media (e.g., Flash memory, a removable hard drive, an optical disc, and so forth). The computer-readable media 1306 is configurable in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1302 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1302. By way of example, and not limitation, computer-readable media includes "computer-readable storage media" and "computer-readable signal media."

"Computer-readable storage media" refers to media and/or devices that enable persistent and/or non-transitory storage of information (e.g., instructions are stored thereon that are executable by a processing device) in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1302, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1310. The computing device 1302 is configured to implement particular instructions and/or functions corresponding to the software and/or hardware modules. Accordingly, implementation of a module that is executable by the computing device 1302 as software is achieved at least partially in hardware, e.g., through use of computer-readable storage media and/or hardware elements 1310 of the processing device 1304. The instructions and/or functions are executable/operable by one or more articles of manufacture (for example, one or more computing devices 1302 and/or processing devices 1304) to implement techniques, modules, and examples described herein.

The techniques described herein are supported by various configurations of the computing device 1302 and are not limited to the specific examples of the techniques described herein. This functionality is also implementable all or in part through use of a distributed system, such as over a "cloud" 1314 via a platform 1316 as described below.

The cloud 1314 includes and/or is representative of a platform 1316 for resources 1318. The platform 1316 abstracts underlying functionality of hardware (e.g., servers) and software resources of the cloud 1314. The resources 1318 include applications and/or data that can be utilized while computer processing is executed on servers that are remote from the computing device 1302. Resources 1318 can also include services provided over the Internet and/or through a subscriber network, such as a cellular or Wi-Fi network.

The platform 1316 abstracts resources and functions to connect the computing device 1302 with other computing devices. The platform 1316 also serves to abstract scaling of resources to provide a corresponding level of scale to encountered demand for the resources 1318 that are implemented via the platform 1316. Accordingly, in an interconnected device embodiment, implementation of functionality described herein is distributable throughout the system 1300. For example, the functionality is implementable in part on the computing device 1302 as well as via the platform 1316 that abstracts the functionality of the cloud 1314.

In implementations, the platform 1316 employs a "machine-learning model," which refers to a computer representation that can be tuned (e.g., trained) based on inputs to approximate unknown functions. In particular, the term machine-learning model can include a model that utilizes algorithms to learn from, and make predictions on, known data by analyzing training data to learn to generate outputs that reflect patterns and attributes of the training data. Examples of machine-learning models include neural networks, convolutional neural networks (CNNs), long short-term memory (LSTM) neural networks, decision trees, and so forth.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a processing device, the method comprising:
    receiving, by the processing device, a selection input selecting a displayed stroke in a user interface;
    obtaining, by the processing device, stroke points defining locations of the displayed stroke in the user interface;
    receiving, by the processing device, a plurality of input points via the user interface, the plurality of input points defining an input stroke, the selection input being an initial set of the plurality of input points;
    editing, by the processing device, locations of the plurality of input points as constrained based on locations of the stroke points of the displayed stroke, the editing including determining a direction of an ordering of the stroke points of the displayed stroke and progressing through the ordering as at least part of mapping the plurality of input points of the input stroke to the stroke points of the displayed stroke, the determining of the direction of the ordering of the stroke points including using a threshold to compare distances between the selection input and at least a selection of the stroke points of the displayed stroke; and
    displaying, by the processing device, the input stroke using the edited locations of the plurality of input points.

2. The method as described in claim 1, wherein the input stroke is displayed as a raster object.

3. The method as described in claim 1, wherein the mapping includes a one-to-many mapping between the plurality of input points and the stroke points.

4. The method as described in claim 1, wherein the input stroke defines at least one attribute specifying a display characteristic to respective input points of the plurality of input points and the displaying of the input stroke using the edited locations of the plurality of input points includes the defined at least one attribute.

5. The method as described in claim 4, wherein the display characteristic is specified using a stylus attribute defining an angle or amount of pressure at the respective input points.

6. The method as described in claim 4, wherein the display characteristic is specified using a stroke attribute specifying a weight, style, brush type, color, pattern, opacity, roundness, smoothness, gradient, or thickness.

7. The method as described in claim 1, wherein the input stroke defines at least a portion of the displayed stroke to be erased.

8. The method as described in claim 1, wherein the displaying causes the input stroke to be displayed over the displayed stroke in the user interface.

9. The method as described in claim 1, wherein the displayed stroke is included in a first layer of a digital image and the input stroke is included in a second layer of the digital image.

10. The method as described in claim 1, further comprising storing the locations of the plurality of input points and corresponding attributes as part of an array usable to support undo and redo operations.

11. A system comprising:
a stroke identification module implemented by a processing device to obtain stroke points defining a location of a displayed stroke in a user interface;
a point mapping module implemented by the processing device to edit locations of a plurality of input points of an input stroke received via the user interface based on locations of the stroke points, an initial set of the plurality of input points being a selection input;
a direction finding module implemented by the processing device to determine a direction of an ordering of the stroke points of the displayed stroke and progress through the ordering as at least part of mapping the plurality of input points of the input stroke to the stroke points of the displayed stroke, the determine of the direction of the ordering of the stroke points includes using a threshold to compare distances between the selection input and at least a selection of the stroke points of the displayed stroke;
a point-to-attribute mapping module implemented by the processing device to map at least one attribute associated with the input stroke to the edited locations of the plurality of input points; and
a rendering engine implemented by the processing device to render the input stroke as a raster object and having the mapped at least one attribute with the edited locations of the plurality of input points.

12. The system as described in claim 11, wherein the input stroke defines at least a portion of the displayed stroke to be erased.

13. The system as described in claim 11, wherein the at least one attribute specifies a display characteristic to respective input points of the plurality of input points.

14. The system as described in claim 13, wherein the display characteristic is specified using a stylus attribute defining an angle or amount of pressure at the respective input points.

15. A method implemented by a processing device, the method comprising:
receiving, by the processing device, a selection input selecting a displayed stroke in a user interface;
obtaining, by the processing device, stroke points defining locations of the displayed stroke in the user interface;
receiving, by the processing device, a plurality of input points via the user interface, the plurality of input points defining an input stroke;
editing, by the processing device, locations of the plurality of input points as constrained based on locations of the stroke points of the displayed stroke, the editing including determining a direction of an ordering of the stroke points of the displayed stroke by comparing distances between an initial set of input points and a subset of stroke points to a threshold and progressing through the ordering based on the direction as at least part of editing the locations of the plurality of input points; and
displaying, by the processing device, the input stroke using the edited locations of the plurality of input points.

16. The method as described in claim 15, wherein:
the input stroke is displayed as a raster object; and
the editing includes mapping locations of the plurality of input points to the locations of the stroke points of the displayed stroke.

17. The method as described in claim 16, wherein the mapping includes a one-to-many mapping between the plurality of input points and the plurality of stroke points.

18. The method as described in claim 15, wherein the input stroke defines at least one attribute specifying a display characteristic to respective input points of the plurality of input points and the displaying of the input stroke using the edited locations of the plurality of input points includes the defined at least one attribute and wherein the display characteristic is specified using a stylus attribute defining an angle or amount of pressure at the respective input points.

19. The method as described in claim 15, wherein the input stroke defines at least a portion of the displayed stroke to be erased.

20. The method as described in claim 15, wherein the displaying causes the input stroke to be displayed over the displayed stroke in the user interface.

* * * * *